United States Patent [19]
Sabatella

[11] Patent Number: 5,561,800
[45] Date of Patent: Oct. 1, 1996

[54] METHOD AND APPARATUS FOR INCREMENTALLY LINKING MODIFIED ROUTINES INTO SOFTWARE

[75] Inventor: Marc Sabatella, Ft. Collins, Colo.

[73] Assignee: Hewlett-Packard Company, Palo Alto, Calif.

[21] Appl. No.: 64,300

[22] Filed: May 19, 1993

[51] Int. Cl.$^6$ ................................................. G06F 9/45
[52] U.S. Cl. ........................ 395/700; 364/DIG. 1; 364/262.5; 364/280.4
[58] Field of Search ............................................... 395/700

[56] References Cited

U.S. PATENT DOCUMENTS

| | | | |
|---|---|---|---|
| 4,558,413 | 12/1985 | Schmidt et al. | 395/600 |
| 5,193,191 | 3/1993 | McKeeman et al. | 395/700 |
| 5,204,960 | 4/1993 | Smith et al. | 395/700 |

FOREIGN PATENT DOCUMENTS

| | | | |
|---|---|---|---|
| 2242293 | 9/1992 | United Kingdom . | |

OTHER PUBLICATIONS

Software Practice & Experience, V. 21(4), Apr. 1991, Chichester, GB, pp. 375–390, W. Wilson Ho et al., "An Approach to Genuine Dynamic Linking".

11th Annual Phoenix Conf. On Computers and Communication, Apr. 1992, IEEE New York, US, pp. 531–538, V. Ramji et al., "Distributed and Optimistic Make: Implementation and Performance".

*Primary Examiner*—Thomas M. Heckler

[57] ABSTRACT

An incremental linker provides for faster linking and portability to a variety of systems and environmnets. The incremental linker uses dynamic linking and loading wherein the originally written routines are linked as a dynamically loadable library. Routines that are subsequently modified are linked as a separately loaded program that calls the dynamically loadable library. The separately loaded program is loaded first, so any modified routine already present in the separately loaded program will be used in place of an equivalent unmodified routine that is present in the dynamic link library. In this manner, the modified routine is used in place of the unmodified routine, thus the modified routine is incrementally linked into the program.

14 Claims, 6 Drawing Sheets

METHOD AND APPARATUS FOR INCREMENTALLY LINKING MODIFIED ROUTINES INTO SOFTWARE

FIELD OF THE INVENTION

The invention relates to a program development environment (PDE) that aids the software developer in constructing, analyzing, and modifying software for a computer.

BACKGROUND OF THE INVENTION

Computers are only as useful, generally, as the programs that the computer will run. Writing software for these programs has become more efficient in the last few years. One area of improvement is the tools and technologies that address one particular component of the program construction, namely, incremental program development (IPD). There are at least two separate aspects to IPD. One is providing a tight loop of edit, build, compile, link, and debug when modifying existing programs another is providing support for rapid prototyping when developing or testing new functionality.

When developing new functionality, it is often desirable to be able to execute partial program, individual functions, or even single lines of code, in order to test the functionality. This capability is also referred to as unit testing, although the latter term can also apply to regression testing of finished code. Typical debuggers all provide the means to execute individual functions in the program being debugged, or to evaluate expressions in the context of the debugged program, but these actions require the presence of a fully linked executable.

When developing new code, the programmer must supply stubs for any functions or objects that have not yet been implemented, and in order to effect any change to the new code being tested, the entire edit-build-compile-link-debug loop must be executed. While providing support for a tight loop would help, what is really needed is the capability to instantly see the effects of a given piece of code independent of the rest of the program.

Incremental program development consists of both the tight loop and rapid prototyping. In order to accelerate the tight loop, we can provide incremental linkers, incremental compilers, and better interaction between debuggers and programs being debugged. In order to support rapid prototyping we can provide a more transparent interface between the debugger and the program being debugged, and provide an interpreter than is integrated with such a debugger.
Tight Loop The standard Unix edit-build-compile-link-debug loop is cumbersome and slow, especially when used to maintain large programs. Current technology helps only in the edit phase, by blurring the line between source files and providing a coherent view of the whole program, through tools such as SoftStatic, a Hewlett-Packard Company product. But when a change is made to the source, the build phase still analyzes all dependencies for the entire program to determine what needs to be recompiled, the compile phase still recompiles the entire source file that was modified, the link phase still recombines all object files and libraries to form the program, and the debugger must still be reloaded with the new program.

The edit phase is inherently incremental in that only the files that are to be changed need to be processed by the editor although it could be made more incremental if only the section of code that is altered would be read or written. The compile phase is inherently incremental in that only the files that were modified or were affected by the modifications are processed by the compiler, although it could be made more incremental if only the affected functions or objects were recompiled. The build, link, and debug phases are entirely monolithic. Any change to a program, no matter how small, causes a full dependency analysis by the build tool, a full link by the linker, and a full program reload by the debugger.
Incremental Linking A linker combines the object files and libraries that comprise a program into a single executable file. It concatenates the individual text and data segments of the input files, relocating the segments as they are copied. When a change is made to a single object file, the entire program must be relinked. All object files and libraries, even those unaffected by the change, are concatenated again to form a new executable file.
Static Linking One way to introduce incremental linking into the relinking process is to have the linker modify the original executable itself, rather than regenerating it from its constituent object files and libraries. The new code and data could be overlayed on top of the original versions, or placed in areas that were specially reserved to hold new code and data. All references to the replaced code and data would have to be patched to refer to the new versions.

There are two problems with this type of scheme. First, it does not scale well. When a change is made to a function such that it no longer fits in the space allocated for it, the executable file must be regenerated. A prototype incremental liner has been developed at Stanford, and this program has a considerable amount of complexity devoted to management of space in the executable file. When space allocated for new code and data is exhausted, the entire executable file from that point on is rewritten. While the claim is that this happens rarely, it has only been tested on relatively small programs, and only on relatively finished programs that experienced only small changes.

The second problem is that it is not very portable, and, as more complexity is added to object file formats, it becomes difficult to support even on a single architecture. For example, the three object file formats that some linkers would need to support are radically different. An incremental linker based on the Stanford design does not handle the various tables used to support shared libraries, and could not be modified to do so without considerable effort. For example, none of this work would apply directly to the Hewlett-Packard Series 700, which has an entirely different object file format, including different symbol table format, relocation types, and shared library tables. Also, none of the work would be applicable to sunOS 4.1 and then much of any SunOS 4.1 implementation would have to be rewritten to work on Solaris, which will feature an entirely new object file format.

One alternative that alleviates these problems is to develop a simple, portable format for executable files that allows new code and data to be easily appended. A special loader would have to be developed as well. It is not certain how easy it would be to abstract away the various complexities in object file formats such as SOM. It is also uncertain what would be the performance implications of using a non-native loader. A simple portable format for executable files is not necessarily a good solution because object file formats differ greatly, and special loaders would probably be slow.
Centerline Centerline provides both a C and C++ development environment based on an integrated interpreter and debugger that also allows for dynamic loading of compiled code. The interpreter allows for rapid prototyping and a fight loop when in maintenance, and the incremental linking functionality, in the form of a dynamic loader, makes the system usable even for relatively large programs, as long as the working set of modules being interpreted is relatively small. One of the biggest weaknesses of Centerline as a tight loop or rapid prototyping environment is that no compiler is provided at all, so the development environment is completely isolated from the eventual build environment. Performance concerns encourage the user to compile as much code as possible, but in order to gain full advantage of the Centerline environment, code must be interpreted.

Lucid

The Lucid Cadillac system has particular features that support incremental program development, an incremental compiler and incremental linker and loader. When a change is made to a source file, only the functions and objects that were affected are recompiled by the system and the resultant incremental compilation unit is incrementally linked into the running program as well as the existing executable file. In theory, this should allow for a fast tight loop, including the ability to continue executing the program in the debugger where it left off. However, people who have seen demos of Cadillac have reported turnaround times are not actually particularly fast, nor can a program continue in the debugger after being modified.

SUMMARY OF THE INVENTION

The present invention provides for faster linking portable to a variety of systems and environments.

The present invention has been dubbed Blink Link. It uses only shell scripts and simple C programs, and is dependent only on specific option letters used by the host linker. It has been observed to decrease relink time in certain contrived cases from a minute to just a second or two. In the Blink Link prototype, the original executable file is actually built as a shared library, and the modified object files are linked against that library. This degrades performance somewhat, since the code in the shared library must be position independent code (PIC), which runs more slowly than ordinary code.

Blink Link

The idea of Blink Link is to use the dynamic linking and loading functionality supported by the host system to achieve the same results as developing a portable object file format that allows new code and data to be easily appended. Rather than develop a special object file format not supported by the underlying systems, the invention uses the existing formats and liners. Rather than appending new code and data to the original executable file, the invention places it in a separate file. And rather than develop a special loader, the invention uses the existing dynamic loading functionality to load the new code into the program at run time.

This type of implementation places several constraints on the underlying dynamic linking and loading functionality. First, it must be possible to debug a program that consists of separate dynamically loaded components. That is, the debugger must allow access to code that has been dynamically loaded. Second, the system must allow symbolic references in the original executable file to be resolved at run time to the new definitions in a separate module. The original executable file will contain the original definition of any given symbol, and it will also contain references to that symbol. If the symbol is redefined, the dynamic linker must resolve all references to that symbol to the new definition.

For example, SunOS 4.1 currently has both of these capabilities, although the support for dynamically loaded modules in dbx(1) is less than perfect. HP-UX currently supports the necessary symbol resolution semantics and does support debugging of dynamically loaded modules. That is, a reference in one executable file to a symbol defined in the same executable file can be resolved at run time to a new definition in another module.

DETAILED DESCRIPTION OF THE DRAWINGS

Figure 1:
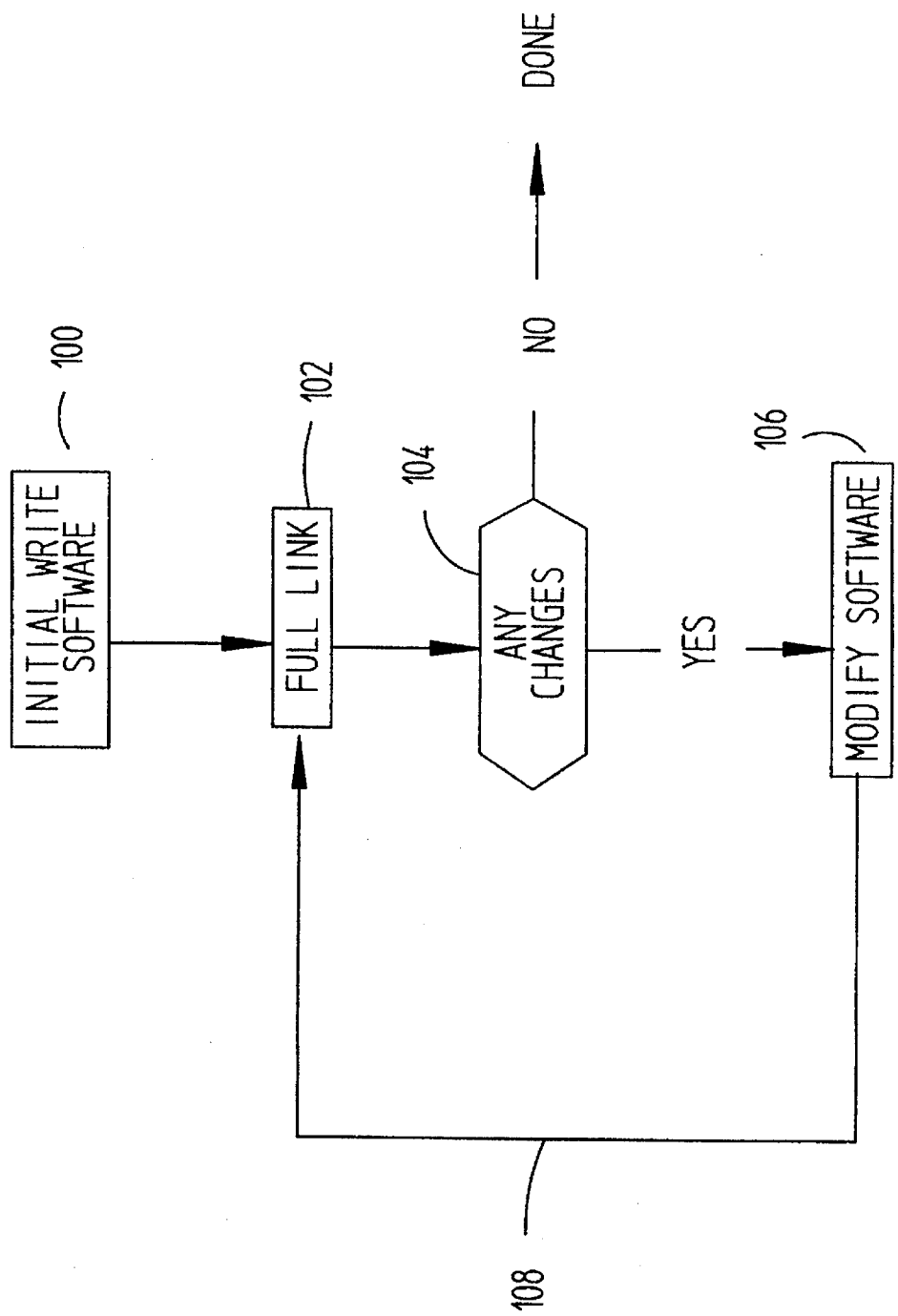
FIG. 1 shows a system employing the Full Link method of modifying software.

In FIG. 1, a Full Link method requires that after the INITIAL WRITE SOFTWARE (100), a FULL LINK (102) is performed. After a FULL LINK (102) the Software is ready to be used. However, when any changes (104) are made and the MODIFY SOFTWARE (106) is done then another (108) Full Link (102) to the Software must be made before the modified Software can be used.

Figure 2:
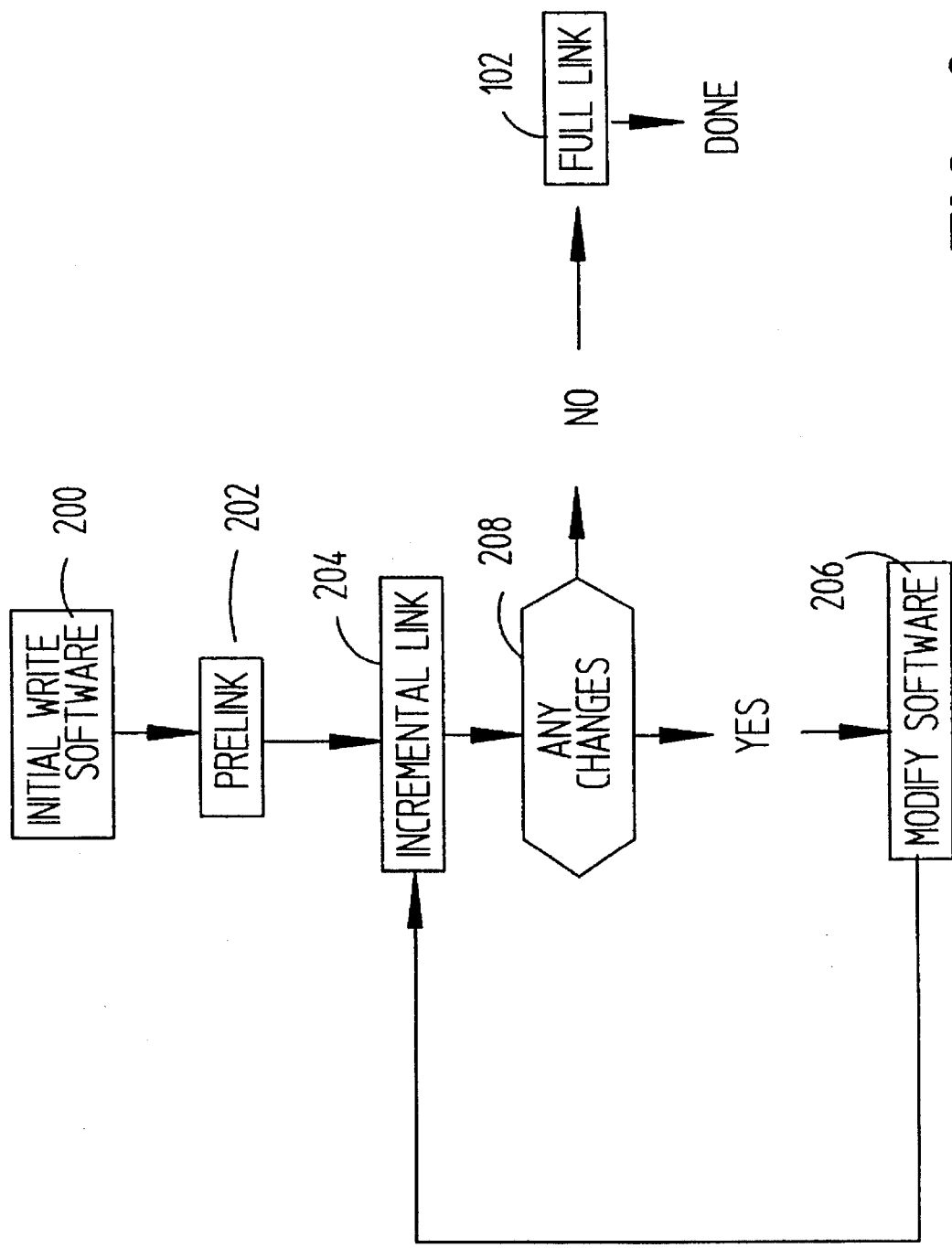
FIG. 2 shows the system that uses the invention.

FIG. 2 shows the use of the invention during the WRITE SOFTWARE (100). After the INITIAL SOFTWARE WRITE (200), a PRELINK (202) is performed, then an INCREMENTAL LINK (204). Now, the Software is ready to be modified (206) using the INCREMENTAL LINK (204) only until there are no more changes (208) and a FULL LINK (102) is performed. When software is being written, the invention can be used to eliminate the need to do a FULL LINK after every modification. By using the invention (Blink Link), only an Incremental Link needs to be performed after modification. This reduces the link time during software writing. There are two phases to Blink Link—the prelink phase and the incremental link phase. A program must be specially prelinked before it can be incrementally linked. The prelink process takes approximately the same amount of time as a standardlink (FULL LINK), which is roughly proportional to the size of the program. The incremental link process takes time proportional to the size of the changes made to the program since the last prelink. Therefore, whenever the changes are less than the size of the entire program, the Incremental Link will take less time.

The Blink Link algorithm is implemented primarily in a "wrapper" around the host system linker "ld". The wrapper parses the options, and if "-prelink" or "-blinc" are seen, repackages the arguments to pass to the host systemlinker. The intended use is for the programmer to pass all of his object files to the linker with the "-prelink" option first, and then on subsequent incremental links, to pass only those objects that have changed since the last incremental link with the "-blinc" option. Blink Link keeps track of the history of all such changes.

When there are no more changes to be made, a Full Link (102) is performed. Among other things, this creates a program that is complete in one piece and not in two parts, the Program (404) that has the modified portions and the Dynamically Loadable Library (304).

Figure 3:
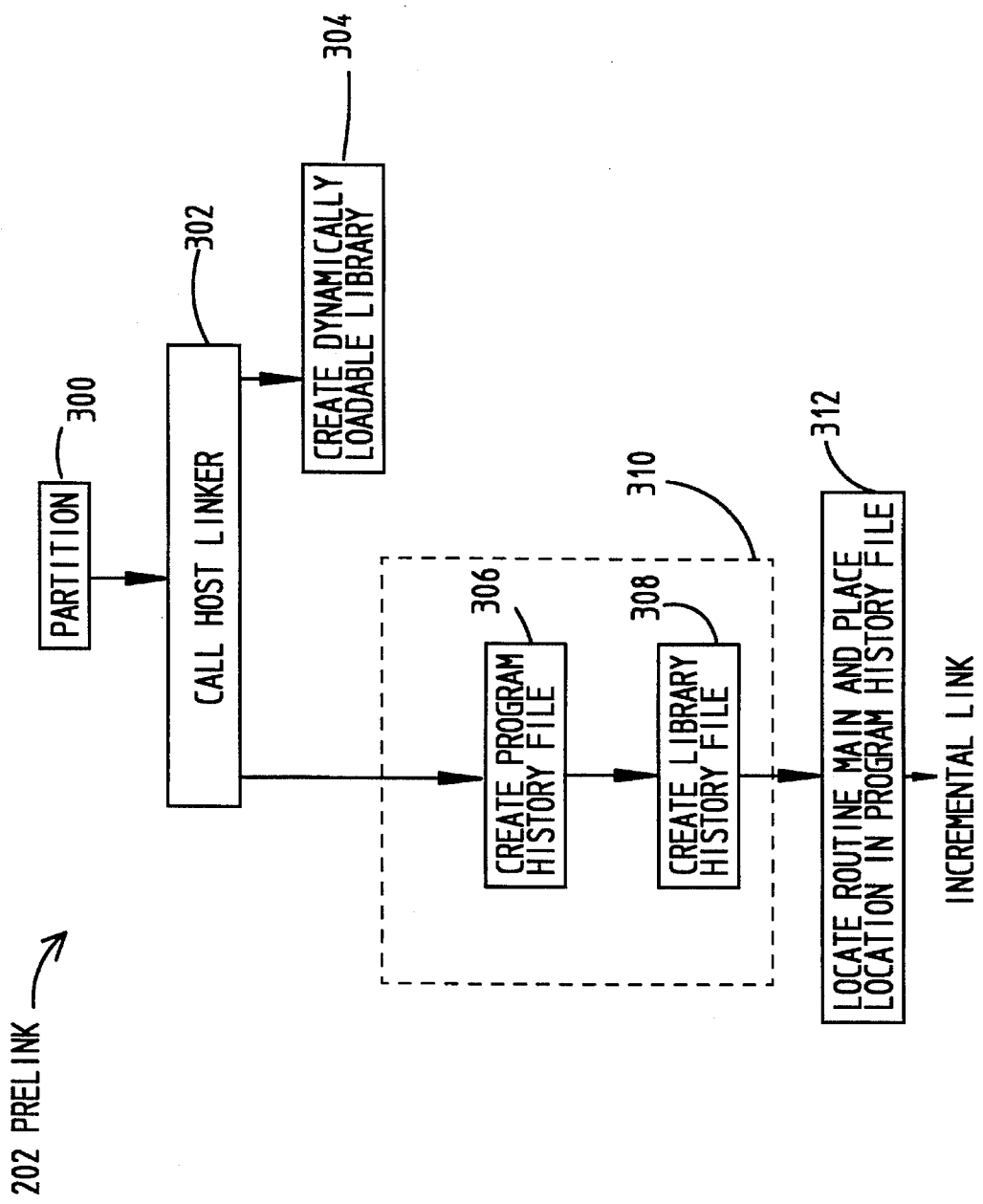
FIG. 3 shows the Prelink portion of the invention.

FIG. 3 shows more detail of the PRELINK phase of the invention. Blink Link is based on the use of the inherent dynamic loading and linking capabilities of the host system to simulate incremental linking. The algorithm followed in the prelink phase is the following:

Partition (300) arguments into object and archive files;

Call host system linker (302) with appropriate arguments to form a dynamically loadable library (304) from those objects and archives;

Initialize a history file function (310) to show that no changes have been made yet by:
  Create a program history file (306) for the program, and place in it the name of the object file containing the main routine; and
  Create an empty library history file (308) for each archive.

By using the host linker, the prelink can be easily written and used for any number of different host systems.

To further elaborate the creation of a program history file (306), the host linker looks for a routine called Main and prints out a message that Main was in a certain file. The name of the file containing the Main routine goes into the Program History file. Main refers to a user-written source file that contains a function called "Main". This Main routine is simply part of the source code.

Figure 4:
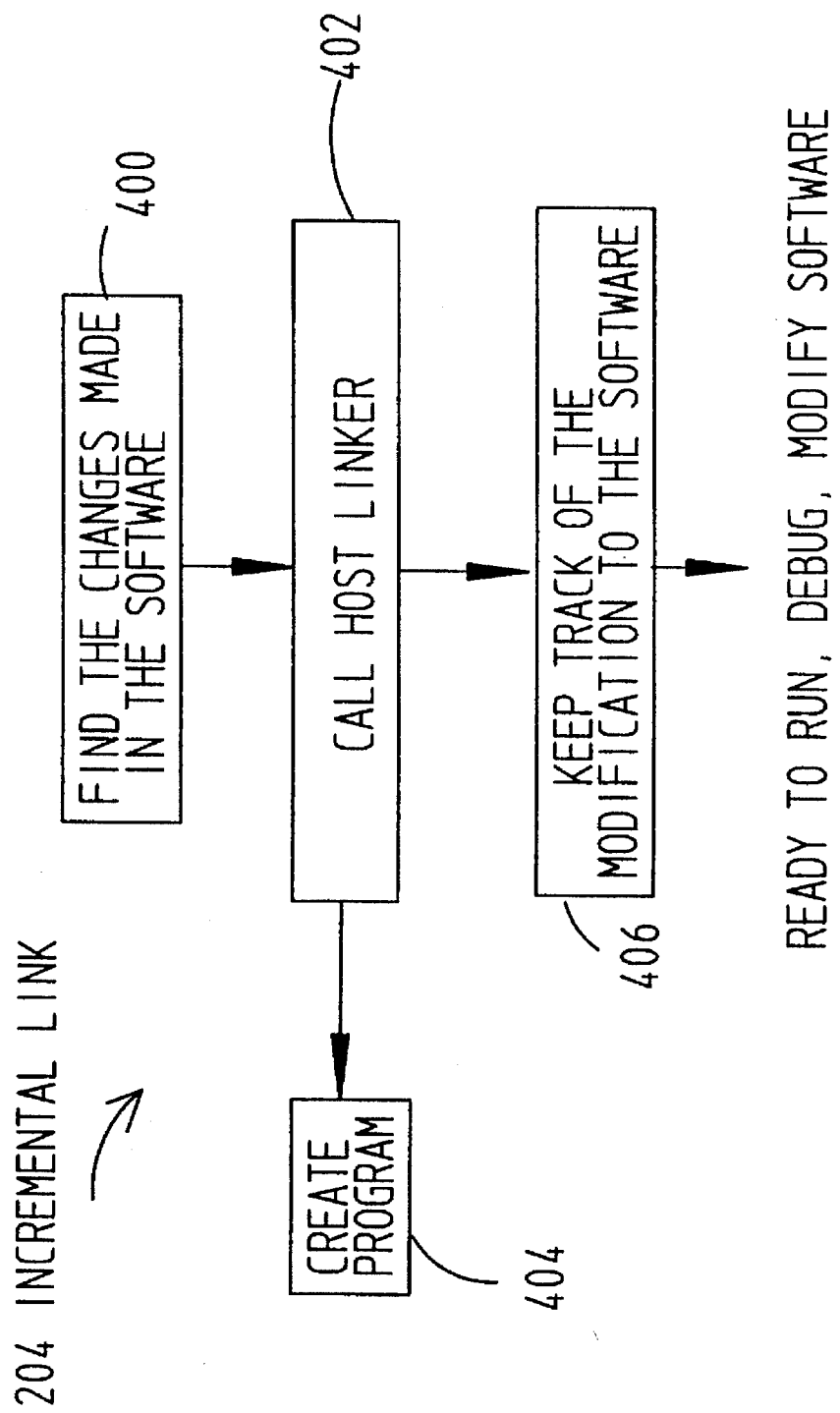
FIG. 4 shows the Incremental Link portion of the invention.

FIG. 4 shows the Incremental Link portion of Blink Link. The Incremental Link phase finds the changes made in the Software (400), calls the host linker (402) to create the program (404), and keeps track of the modifications to the software (406). The program (404) created in this incremental link phase is the program the user wrote during the modification. The program (404) can be run, however it only contains the object files (the compiled versions of the source files) that you had actually modified. All of the rest of the user program, the part that has not changed, is in the dynamically loadable library. If the user were to run the Program (404), the Program is going to dynamically (at run time) load the dynamically loadable library (304). In order to run Program (404), the dynamically loadable library (304) must be present on the system running the Program (404) at this point, before modifications are complete and a Full Link has been done. A Full Link incorporates everything into one complete program so that the dynamically loadable library is not needed.

In the prelink portion, the Main routine goes into the Program History file so that it will be included in the Program produced by the host linker during the incremental link portion. Otherwise, since no changes have been made between prelink and the first incremental link then Program would contain nothing. Some system debuggers have problems with empty programs.

Figure 5:
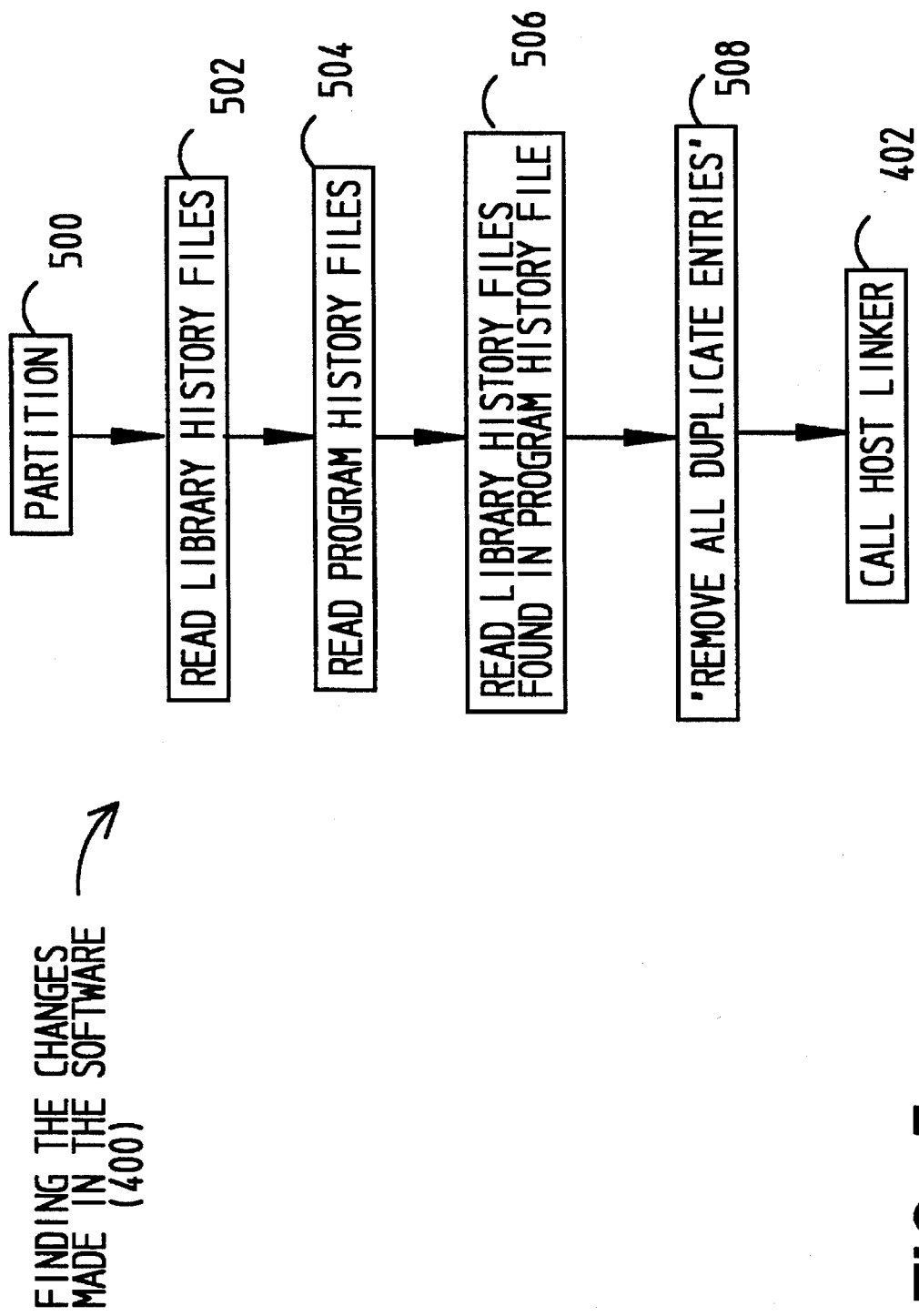
FIG. 5 shows an implementation of how the Incremental Link finds the changes made in the Software.

FIG. 5 shows an implementation of finding the changes made in the Software in the Incremental Link phase of Blink Link. The algorithm followed in the incremental link phase is the following:

FIND THE CHANGES MADE IN THE SOFTWARE (400)

Partition (500) arguments into nonprelinked files, prelinked objects, prelinked archives, and other system files;

For each prelinked archive specified, read library history file (502) to obtain list of incrementally linked members;

Read program history file (504) for program to obtain list of incrementally linked files;

For each archive in this list, read library history file (506) to obtain list of incrementally linked members; and Remove all duplicate entries (508) from lists.

CALL HOST LINKER (402)

Call host system linker with appropriate arguments to form a program from the nonprelinked files, the newly modified files, the incrementally linked files, the prelinked dynamically loadable library, and the other system files.

Figure 6:
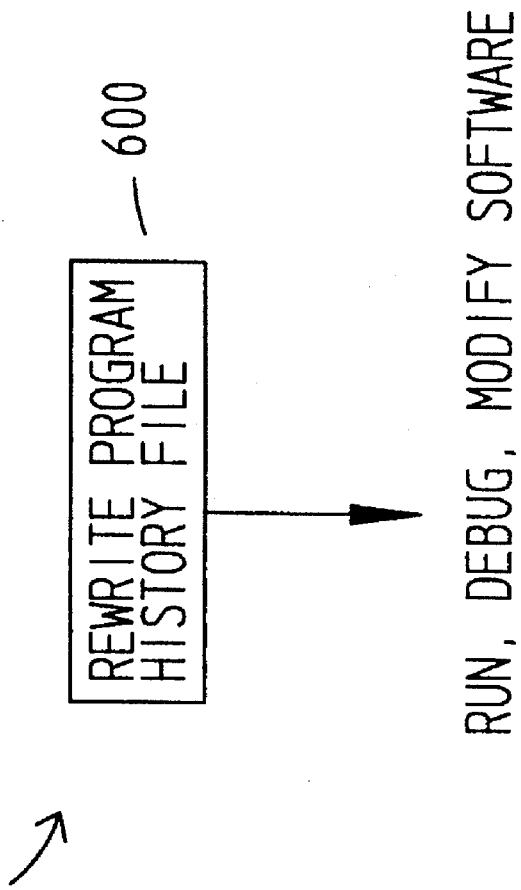
FIG. 6 shows an implementation of how the Incremental Link keeps track of the modifications to the Software.

FIG. 6 shows an implementation of keeping track of the modifications to the Software.

KEEP TRACK OF THE MODIFICATION TO THE SOFTWARE

Rewrite program history file (600) for the program, listing all incrementally linked object and archive files.

Auxiliary code is provided in a wrapper around the host system archiver "ar" to update an archive history file whenever members are replaced or added. The names of all such modified members are merged into the archive history file.
Best Mode Implementation The implementation used in Softbench 3.0 is provided as an example in Appendix A. This is the code for "ld" itself. The supporting environment consists of some scripts and configuration files that are provided as part of the Softbench product, and documented fully in the Softbench documentation.

The following describes the instructions for using an embodiment of the invention in a software product called SoftBench and improving development time with Blink Link.

The SoftBench Program Builder includes a mode called Blink Link which allows you to build and re-link only those modules that are modified. This is an advanced feature, and is normally useful only for large and complex software projects.

The Blink Link mode lets you re-link only the parts of your program that have been modified. This can greatly improve your productivity if you are working on a large software project. Rather than re-linking your entire program to test a change in one module, you can pre-link the program once, and link your changed module on top of the pre-link file. Since the pre-link pass resolves most of the internal references in your program, and bundles most of your object modules into one file, the incremental link can build much more quickly.

Blink Link Overhead

There is some overhead associated with the Blink Link process. First, you must create the pre-link file, which takes roughly as long as a normal build of your program. You will also need to re-make the pre-link file from time to time to incorporate changes in other parts of the program. The pre-link is built using shared libraries, which have some run-time overhead associated with them. Finally, you will want to re-build your program with Blink Link disabled to produce a release.

Using the Incremental Linking feature of SoftBench Program Builder requires some setup. You must:
1. Prepare your Makefile to do the pre-linking incremental links
2. Configure SoftBench Program Builder to invoke the incremental linker 3. Produce the pre-link
Preparing your Makefile Different link-time flags are passed to the linker when you use Blink Link. Your Makefile must contain extra targets to invoke the linker with the new Blink Link flags. For example, if the top-level target for your software program is all, then you will need targets called all.prelink and all.blinc. These new targets will be invoked by SoftBench Program Builder during the pre-link and incremental-link phases.

It's a good idea to save a copy of your Makefile before making these changes! You may discover you did something you didn't want to do, and it's much easier to recover if you have the original Makefile available.

This table explains the Makefile changes required in different situations:

| Makefile Change Guidelines | |
|---|---|
| Your Situation | Recommended Action |
| You built your Makefile using the mkmf facility in the current version of SoftBench Program Builder | No action necessary. mkmf inserted the new targets for you. |
| You built your Makefile using mkmf in a previous version of SoftBench Program Builder, or using mkmf outside of SoftBench Program Builder. | Move your Makefile to another filename or directly. (This will force mkmf to build a new Makefile using the buildt.p template.) Choose "Makefile: Create Program" to create a new Makefile with the new Blink Link targets. Merge in any custom rules from your old Makefile. |
| Your Makefile was created manually, or you have made changes to your Makefile which you don't want overwritten by mkmf. | You must add the Blink Link targets manually. See the next section. |

Adding Blink Link Targets Manually

You can modify an existing Makefile to add the Blink Link targets. This involves adding some new rules to the Makefile and partitioning your files into several sets. These sets are then assigned into make macros (ARCHIVES, LIBS, SYSLIBS, and so on) which are used in the new Blink Link rules.

Start by examining the template file /usr/softbench/config/buildt.p. This is the pattern SoftBench Program Builder uses when it constructs a Makefile for you.

Your Makefile contains one or more "top-level" make targets to build your program. The buildt.p template file assumes there is only one program-generating target. The macro variable $(PROGRAM) points to this program (a.out by default). This description will refer to $(PROGRAM) as the desired program name. Notice also that the buildt.p file contains a top-level rule named all. This is required for the Makefile to work correctly with SoftBench Program builder when no target is specified in the Target: Input Box. (The default top-level rule name can be changed using the buildDefaultTarg resource.)

You must add three classes of rules to your Makefile: a pre-link rule and two Blink Link rules. These rules must have target names of $(PROGRAM).prelink, $(PROGRAM).blinc, and $(PROGRAM).alt.blinc. SoftBench Program Builder will invoke these target names when you have enabled Blink Link mode. Similarly, you should also have all.prelink and all.blinc rules that invoke $(PROGRAM) rules.

Using the buildt.p file as an example, add these new rules into your Makefile. Next you will need to partition your files (object files, libraries, and so on) into several variables:

| | |
|---|---|
| LIBS | Includes non-Blink Link shared libraries and archive libraries which are under development, and any Blink Link shared libraries. Must be full pathnames. |
| SYSLIBS | Includes libraries which are not likely to change, such as system libraries and libraries not under development. May use −l options. |
| ARCHIVES | Includes only archive libraries which are likely to be compiled with Blink Link. Must be full pathnames. |
| OBJS | Includes object (.o) files compiled with Blink Link. |
| NONPRELINK | Includes object files not compiled with Blink Link. |

Once you have assigned the proper filenames to these macros, your Makefile should work correctly with the rules extracted from buildt.p.

Configuring SoftBench Program Builder for Blink Link

Next you must tell SoftBench Program Builder to use the Blink Link feature by choosing the "Options: Enable BLIncLink" menu item.

This enables the "Actions: Prelink" menu choice, and affects the "Actions: Preview" and "Actions: Build" selections. While Blink Link is enabled, any previews or builds will append ".blinc" or ".prelink" to appropriate target names, and pass -blinc or -prelink flags to the compiler. This causes SoftBench Program Builder to produce an incremental build instead of the normal full build.

Pre-linking Your Program

Now you should initialize your program for Blink Link by creating a pre-linked version of your program with all internal references resolved.

The object files you build into your pre-link must be compiled with -blinc or -prelink. If you have not been building Blink Link files, you must remove the non-Blink Link files and start in a "clean" environment.

Choose "Actions: Prelink". This invokes your make program with .prelink appended to your default build target. It also passes a -prelink option to the compilers, which ensures new object files can be linked into the pre-link file.

This pre-link file will be used for any future Blink Link builds. If you are working alone on a project, you will need to re-build your pre-link only when you decide you don't want to have to incrementally link your set of changed modules any more. However, if you are working in a team, you will want to re-build your pre-link whenever you need to incorporate new code from your team members.

Building Modules for Incremental Linking

Once you have a pre-linked version of your program, you are ready to link with the few modules you're currently working on.

If you have modified one or more source files since you did the pre-link, SoftBench Program Builder will automatically re-compile your modules and link the new object files with your pre-link file when you request a build. (This assumes that the "Options: Enable BLIncLink" mode is still enabled.) SoftBench Program Builder will take care of the proper incremental linking.

Sometimes you want to re-link some modules that have not be modified. For example, you may want to use SoftBench Program Debugger to trace the flow of execution in one of your functions. This requires you to re-compile the module with the "debug" flags turned on, even if you haven't changed the program source.

To do this, you must force your make program to re-compile those modules. If you are using nmake, it will recognize the change in compile flags and force a re-compile of the specified modules. make, however, will not force a re-compile based only on compiler flag changes, and you will need to remove the appropriate object files (or touch the appropriate source files) to be sure make re-compiles those files.

Once you have done this, you can change your compile flags as desired, probably using the "Options: CompileMode" dialog box, and request another build.

Once you incrementally link a module with your pre-link, you must always incrementally link that module until you do a new pre-link. This will be handled automatically by the Blink Link control software. Even if you made no changes to the source files, you cannot "unincrementally-link" a module without building a new pre-link.

When you finish working on one module and want to move on to another, you have two choices: do a new pre-link so that your changes are incorporated and you don't need to incrementally link the old module any more; or just start working on the new modules as you did on the previous ones. SoftBench Program Builder will keep track of changed modules and properly handle the Blink Link builds.

Rebuild for Final Delivery

When you are finished with your development phase, you will want to create a non-Blink Link executable file. To do this, remove the current Blink Link executable and pre-link, and disable the Blink Link option using the "Options: Enable BLIncLink" menu choice. If you built any ,modules with the Debug or Static flags enabled, you will probably want to remove those modules as well. If you used mkmf to create your Makefile, make clobber will remove all your object files and Blink Link files. Next turn off the Debug and Static flags using the "Options: CompileMode" menu choice. For final product delivery you will probably want to build an optimized version, which can be selected in this dialog box. Then choose "Actions: Build", or select the Build button, to re-build your program.

You might instead choose to deliver the Blink Link executable to your users, but it runs slightly slower than a non-Blink Link executable. You would also need to deliver both the Blink Link executable and the pre-link file, which is actually a shared library. Due to the implementation of shared libraries, you must deliver the pre-link library in the same directory as it was linked in. So, for example, if you linked your Blink Link program in /users/charlie/myprog, and you wanted to install it on another system, you would have to copy the pre-link library into a directory /users/charlie/myprog on the other system. For these reasons, using the Blink Link executable as a delivery vehicle is not recommended.

In either case, you will need to use the lbd ("List Blink Link Dependencies") command: lbd [-R] file lbd will show the derived names of any pre-linked or incrementally linked modules associated with the specified program or library. When invoked with the -R option, all shared libraries associated with the file are recursively analyzed. In other words, if a program is linked with a shared library that was created using Blink Link, the "lbd -R program" will list not only the pre-link file for the program, but also the incremental module associated with the shared library.

Customizing Blink Link

In addition to the controls provided within SoftBench Program Builder, several options and flags can be controlled via resources. These resources can either be placed in your .Xdefaults or xrdb file, for global customization, or in .softbenchrc files, for directory-local customization. The .softbenchrc files give you tremendous flexibility and power in your customization, allowing you to have different customizations for each project you work on. See "Customizing SoftBench Program Builder Behavior" for a more complete description.

The Blink Link customization resources include flags to control the initial setting of the "Options:Enable BLIncLink" toggle button, valid Blink Link targets, and so on:

| | |
|---|---|
| Build.blincLink | Default setting of the "Options:Enable BLIncLink" toggle |
| Build.validBlincExt | Filename suffixes to which the above extensions should be added, such as ".out" in "a.out". No other target names with suffixes are considered Blink Link-able. |
| Build.blincIgnoreTargs | make targets which are not Blink Link-able, and |
| Build,blincDefaultTarg | the default target to use when the Target: field is empty |

Appendix A

```
/*
 * ld.c
 *
 * ld: BLIncLink linker
 *
 * Synopsis:
 *      Invoked as normal "ld", but accepts new options -prelink & -blinc
 *
 */
/* $Revision: 1.20 $ */ static char sbid[] =
"@(#)REV: Unsupported version; Do Not Distribute; Use at your own risk!";
/* system header files */ include <stdio.h>
include <stdlib.h>
#include <stdarg.h>
#include <ctype.h>
#include <string.h>
#include <signal.h>
#include <limits.h>
#include <unistd.h>
#include <errno.h>
#include <ar.h>
#include <sys/types.h>
#include <sys/stat.h>
```

| | |
|---|---|
| 1 | #include <sys/wait.h> |
| 2 | #include <sys/utsname.h> |
| 3 | #include <regex.h> |
| 4 | /* constant definitions */ |
| 5 | #define Short_len    255 |
| 6 | #define Reg_flags    (REG_EXTENDED\|REG_NOSUB) |
| 7 | #define Max_args    _POSIX_ARG_MAX |
| 8 | /* type definitions */ |
| 9 | typedef char Path_t[_POSIX_PATH_MAX]; |
| 10 | typedef char Short_string_t[Short_len]; |
| 11 | typedef enum { Main, Shlib, Relocatable } Output_type_t; |
| 12 | typedef enum { None, Blinc, Prelink } Blinc_mode_t; |
| 13 | typedef enum { Warning, Serious, Fatal } Severity_t; |
| 14 | typedef enum |
| 15 | { |
| 16 |     Do_prelink, |
| 17 |     Do_blinc, |
| 18 |     Do_shlib, |
| 19 |     Option_file, |
| 20 |     Verbose, |
| 21 |     Ignore, |
| 22 |     Build_main, |
| 23 |     Build_main2, |
| 24 |     Build_shlib, |

```
1            Build_shlib2,
2            Build_relocatable,
3            Name_output,
4            System_always,
5            System_pre,
6            System_post,
7            Library,
8            User_object,
9            User_archive,
10           User_shlib,
11           Main_option,
12           Main_option2,
13           Num_argument_types
14      } Argument_type_t;

15      typedef struct
16      {
17           regex_t pattern;
18           Argument_type_t meaning;
19      } Argument_mapping_t;

20      typedef struct
21      {
22           Path_t archiver;
23           Path_t linker;
24           Output_type_t default_output;
25           Short_string_t shlib_ext;
26           Short_string_t build_shlib;
27           Short_string_t trace_main;
```

```
1       Short_string_t re_main;
2       Argument_mapping_t argument[Num_argument_types];
3   } Linker_t;

4   typedef enum{
5       E_no_config,
6       E_bad_config,
7       E_bad_hist,
8       E_nofile,
9       E_notmp,
10      E_create,
11      E_remove,
12      E_nomem,
13      E_blinc_r,
14      Num_E_types
15  } E_t;

16  typedef struct{
17      char *msg;
18      char *fmt;
19      Severity_t severity;
20  } Error_t;

21  /* global variables */

22  int Verbose_flag;                        /* verbose flag */
23  Blinc_mode_t Blinc_mode;     /* BLIncLink mode */
24  Output_type_t Output_type;   /* output type */
25  char *Output_file;                       /* output file name */
```

```
1    char *Pre_args[Max_args];  /* arguments for blinc before user
2                                   files
3    */char *Post_args[Max_args];    /* arguments for blinc after prelink
4                                   module
5    */char *Prelink_args[Max_args];/* arguments for a prelink */
6    char *User_files[Max_args];     /* user files */
7    char *Objects[Max_args];        /* user object files */
8    char *Archives[Max_args];       /* user archive files */

9    int Argc;                  /* number of arguments for system linker */
10   char *Argv[Max_args];      /* arguments for system linker */
11   int Rc;                    /* exit code */

12   Path_t Tmpdir;             /* directory for temporary files */
13   Path_t Softbench;     /* softbench installation directory */
14   Path_t Bin;                /* softbench bin directory */
15   Path_t Config;             /* softbench config directory */

16   Path_t Project;            /* current project directory */ Linker_t Linker;   /* data
17   structure describing system linker */ char *C_name, *C_line
18   ;FILE *C_file;

19   Error_t Error[] =
20   {
21       { "unable to open configuration file", "", Fatal },/*          E_no_config */
22       { "error in configuration file", " - '%s'", Fatal },
23           /* E_bad_config */
24       { "error in history file", " - '%s'", Fatal },
25           /* E_bad_hist */
```

```
1       { "unable to access file", " %s", Fatal },
2               /* E_not file */
3       { "unable to create directory", " %s", Fatal },
4               /* E_notmp */
5       { "unable to create file", " %s", Fatal },
6               /* E_create */
7       { "unable to remove file", " %s", Fatal },
8               /* E_remove */
9       { "out of memory", "", Fatal },                                                       *
10   E_nomem */
11      { "relocatable blinc not supported", "", Serious },
12              /* E_blinc_r */
13      { NULL, NULL, Fatal }
14    };
15    char *Blinc_processorv[Max_args];
16    char **Blinc_processorvp = Blinc_processorv + 2;

17    #if defined(__hpux) && VERSION == 80
18    /* This code was supposed to be portable,
19     * and differences were supposed to be confined to the configuration     file.
20     * This is a temporary workaround is necessary for hpux 8.0 however, * because the 8.0 pxdb
21    does not handle shared libraries,
22     * but the 9.0 linker will try to call it anyhow.
23    */char
24    *pxdb;
25    Short_string_t ld_pxdb;
26    #endif 27    /* function declarations */
```

1   void setup (void);
2   void read_configuration (void);
3   char *get_next_string (FILE *fp, int abort_flag);
4   char *trim (char *s);
5   Output_type_t keyword (char *s);
6   void parse_arguments (char ** argv);
7   int check_system (char *file);
8   char *get_next_arg (char **argv);
9   char *get_next_word (FILE *fp, char **line);
10  char **process_archive (char *archive, int stat_flag, char **argument_list);
11  char *process_member (char *member, char *directory, char *archive);
12  char *ar_trim (char *s, int length);
13  char **process_shlib (char *shlib, char **argument_list);
14  char *string_dup (char *source);
15  int execute_command (void);
16  int forkexec (char *program, char **argv, char *out, char *err);
17  int do_prelink (Output_type_t output_type);
18  int do_blinc (Output_type_t output_type);
19  char *get_stamp (char *stamp, const char *file);
20  char *get_history (char *out, const char *in);
21  void set_history (char *name, char **list);
22  void cleanup (int signum);
23  void error (int code, ...);

24  /* macro definitions */
25  #define get_global_history(out,in)
26  (strcat(strcpy(out,in),".bld_history"))
27  #define get_prelink(out,in)              (sprintf(out,"%s_bld.%s",in,Linker.shlib_ext))

```
1    /* function definitions */
2    /*ARGSUSED*/
3    main (int argc, char **argv)
4    {
5        int rc;
6        setup();
7        parse_arguments(argv);
8        if (rc = execute_command())
9            Rc = rc;
10       cleanup(Rc);

11       /*NOTREACHED*/
12       return 1;
13   }
14   void setup (void)
15   /*
16    * effects:
17    *    initializes global variables
18    *    reads configuration
19    *    other miscellaneous initialization
20    */
21   {
22       Short_string_t pid;
23       char *s, *host, *dir, *file;
24       struct utsname uts;
25       /* set up ${TMPDIR:-/tmp}/bld directory for temporary
26               files */
27       if ((s = getenv("TMPDIR")) == NULL)
28           s = "/tmp";
```

```
1       sprintf(Tmpdir,"%s/bld%d",s,getpid());
2       if (mkdir(Tmpdir,0777) && errno != EEXIST)
3   error(E_notmp,Tmpdir);
4       /* allow /usr/softbench to be overridden by $SOFTBENCH */
5       if ((s = getenv("SOFTBENCH")) != NULL)
6   strcpy(Softbench,s);
7   else
8       strcpy(Softbench,"/usr/softbench");

9       strcat(strcpy(Bin,Softbench),"/bin");
10  strcat(strcpy(Config,Softbench),"/config");

11      /* construct project context directory name */
12      if (uname(&uts))
13          error(E_no_config);
14      host = string_dup(getenv("SBHOST"));
15      dir = string_dup(getenv("SBDIR"));
16      file = string_dup(getenv("SBFILE"));
17      if (host != NULL && *host &&   strcmp(host,uts.nodename))
18      {
19          strcat(Project,"/nfs/");
20          strcat(Project,host);
21      }
22      if (file != NULL && *file == '/')
23          strcat(Project,file);
24      else if (dir != NULL)
25          strcat(Project,dir);
26      if (file != NULL && *file && *file != '/')
27      {
```

```
1              strcat(Project,"/");
2              strcat(Project,file);
3          }
4       if (!*Project)
5              strcpy(Project,".");
6       if (host != NULL)
7              free(host);
8       if (dir != NULL)
9              free(dir);
10      if (file != NULL)
11             free(file);
12      signal(SIGABRT,cleanup);
13      signal(SIGTERM,cleanup);
14      signal(SIGINT,cleanup);

15      read_configuration();
16  }
17  void read_configuration (void)
18  /*
19   * on entry:
20   *     all other initialization has taken place
21   * effects:
22   *     reads configuration file to determine characteristics of          native system
23   * on exit:
24   *     the "Linker" data structure is set up
25   */
26  {
27         Path_t config_name;
28         FILE *config_file;
```

```
1       Argument_type_t i;
2       char *s;
3       /* try project directory */
4  strcat(strcpy(config_name,Project),"/.bldrc");
5       if ((config_file = fopen(config_name,"r")) == NULL)
6       {
7               /* no, then try config directory */
8  strcat(strcpy(config_name,Config),"/bldrc");
9           if ((config_file = fopen(config_name,"r")) ==
10 NULL)                              error(E_no_config);
11      }
12      s = get_next_string(config_file,1);
13      if (access(s,X_OK))
14              strcat(strcpy(Linker.archiver,Softbench),s);
15      else
16              strcpy(Linker.archiver,s);
17      s = get_next_string(config_file,1);
18      if (access(s,X_OK))
19      strcat(strcpy(Linker.linker,Softbench),s);
20      else
21              strcpy(Linker.linker,s);
22
23      Linker.default_output=keyword(get_next_string(config_file,1));
24 strcpy(Linker.shlib_ext,get_next_string(config_file,1));
25 strcpy(Linker.build_shlib,get_next_string(config_file,1));
26      if ((s = getenv("TRACE_MAIN")) != NULL)
27      {
28              strcpy(Linker.trace_main,s);
29      get_next_string(config_file,1);
```

```
1      }
2      else
3           strcpy(Linker.trace_main,get_next_string(config_file,1));
4           if ((s = getenv("RE_MAIN")) != NULL)
5           {
6                strcpy(Linker.re_main,s);
7                get_next_string(config_file,1);
8           }
9           else
10               strcpy(Linker.re_main,get_next_string(config_file,1));

11     for(i=(Argument_type_t)0;i<Num_argument_types;++i)
12     {
13          if(regcomp(&(Linker.argument[i].pattern),s=get_next_string(config
14     _file,1),Reg_flags))
15                     error(E_bad_config,s);                    Linker.argument[i].meaning=
16     i;
17          }
18          if (fclose(config_file))
19     #pragma BBA_IGNORE
20                error(E_bad_config,"(fclose)");
21     }

22     char *get_next_string (FILE *fp, int abort_flag)
23     /*
24      * on entry:
25      *     fp = file
26      *     abort_flag = true if EOF is failure
27      * effects:
```

```
1       *       reads next string (line) in file
2       *       aborts on any error (including EOF) if abort_flag is set
3       * returns:
4       *       pointer to static storage containing next string in file
5       *       NULL on any error (including EOF) if abort_flag is not set    */
6       {
7               static Short_string_t s;
8               if (fgets((char *)s,Short_len,fp) == NULL)
9               {
10                      if(abort_flag)
11                              error(E_bad_config,"(fgets)");
12                      return NULL;
13              }
14              return (trim((char *)s));
15              }char *trim (char *s)
16      /*
17       * on entry:
18       *      s = a string ending in a newline
19       * effects:
20       *      strips newline from s
21       * returns:
22       *      s
23       */
24      {
25              s[strlen(s)-1] = 0;
26              return s;
27      }

28      Output_type_t keyword (char *s)
```

```
1   /*
2    * on entry:
3    *     s = a string
4    * returns:
5    *     enumerated type element corresponding to s
6    */
7   {
8           if (!strcmp(s,"Main"))
9                   return(Main);
10          if (!strcmp(s,"Shlib"))
11                  return(Shlib);
12          if(!strcmp(s,"Relocatable"))
13                  return(Relocatable);
14          else
15                  error(E_bad_config,s);
16          return Main;
17  }
18  void parse_arguments (char **argv)
19  /*
20   * the main parse routine
21   */
22  {
23          Argument_type_t arg;
24          char *s;
25          char **pre_arg, **post_arg, **prelink_arg, **otherv;
26          char **user_file, **object, **archive;
27          Short_string_t build_shlib;
28          char *token, *source;
29          /* set defaults */
```

```
1        Blinc_mode = None;
2        Output_type = Linker.default_output;
3        Output_file = "a.out";

4        /* initialize pointers */
5        pre_arg = Pre_args;
6        post_arg = Post_args;
7        prelink_arg = Prelink_args;
8        user_file = User_files;
9        object = Objects;
10       archive = Archives;

11       Argv[Argc++] = Linker.linker;
12       /* loop through arguments */
13       while (s = get_next_arg(argv))
14       {
15               for (arg = (Argument_type_t)0; arg < Num_argument_types;
16   ++arg)
17               if(!regexec(&(Linker.argument[arg].pattern),s,0,NULL,0))
18   break;
19               Argv[Argc++] = s;
20               switch (arg)
21               {
22                   case Do_prelink:
23                       Blinc_mode =Prelink;
24                       Argv[--Argc] = NULL;
25                       break;
26                   case Do_blinc:
```

```
 1                    /* If there were any object or archives
 2                       encountered already, they need to be
 3             rolled into the pre_args. */
 4                       if (Blinc_mode !=Blinc)
 5                       {
 6                           Blinc_mode = Blinc;
 7                           otherv = Objects;
 8                           while ((*pre_arg = *(otherv++)) !=NULL)
 9                               ++pre_arg;
10                           otherv =Archives;
11                           while ((*pre_arg = *(otherv++)) !=NULL)
12                               ++pre_arg;
13                       }
14                       Argv[--Argc] = NULL;
15                       break;
16                   case Do_shlib:
17                       Output_type =Shlib;
18                       Argv[--Argc] = NULL;
19                       strcpy(build_shlib,Linker.build_shlib);
20                       source = build_shlib;
21                       while ((token = strtok(source," ")) != NULL)
22                       {
23                           source = NULL;
24                           *(pre_arg++)=Argv[Argc++]=string_dup(token);
25                       }
26                       break;
27                   case Option_file:
28                       C_name = get_next_arg(argv);
29                       if ((C_file = fopen(C_name,"r")) == NULL)
```

```
1              error(E_nofile,C_name);
2              C_line = NULL;
3              Argv[--Argc] =NULL;
4              break;
5         case Verbose:
6              Verbose_flag = 1;
7         case Ignore:
8              Argv[--Argc] =NULL;
9              break;
10        case Build_main:
11             Output_type = Main;
12             *(pre_arg++) = s;
13             break;
14        case Build_main2:
15             Output_type = Main;
16             *(pre_arg++) = s;
17             *(pre_arg++) =
18   Argv[Argc++]=get_next_arg(argv);              break;
19        case Build_shlib:
20             Output_type =Shlib;
21             *(pre_arg++) = s;
22             break;
23        case Build_shlib2:
24        Output_type=Shlib;
25        *(pre_arg++)=s;
26        *(pre_arg++)=Argv[Argc++]=get_next_arg(argv);
27        break;
28        case Build_relocatable:
```

```
1                           Output_type = Relocatable;
2        *(pre_arg++) = s;
3                           break;
4      case Name_output:
5                           Argv[Argc++]=Output_file=get_next_arg(argv);
6                           break;
7      case System_always:
8                           *(post_arg++) =s;
9                           *(prelink_arg++) = s;
10                          break;
11     case System_pre:
12                          *(pre_arg++) = s;
13                          break;
14     case System_post:
15     case Library:
16                          *(post_arg++) = s;
17                          break;
18     case User_object:
19                          *(user_file++) = s;
20                          if (Blinc_mode == Blinc)
21                          {
22                                  *(Blinc_processorvp++) = s;
23                                  *(pre_arg++) = s;
24                          }
25                          *(prelink_arg++) = s;
26                          *(object++) = s;
27                          break;
28     case User_archive:
```

```
1              /* check to see if this thing is really not a
2       user file */
3              if(check_system(s))
4              {
5                      *(post_arg++) = s;
6                      break;
7              }
8              *(user_file++) = s;
9              if (Blinc_mode == Blinc)
10             {
11                     pre_arg =process_archive(s,1,pre_arg);
12                     *(post_arg++) = s;
13             }
14             *(prelink_arg++) = s;
15             *(archive++) = s;
16             break;
17     case User_shlib:
18             post_arg =process_shlib(s,post_arg);
19             break;
20     case Main_option:
21             *(pre_arg++) =s;
22             break;
23     case Main_option2:
24             *(pre_arg++) = s;
25             *(pre_arg++) = Argv[Argc++]=get_next_arg(argv);
26             break;
27     default:
28             *(pre_arg++) = s;
29             *(prelink_arg++) = s;
```

```
1                          break;
2                   }
3              }
4      }
5      int check_system (char *file)
6      /*
7       * on entry:
8       *      file = name of file
9       * returns:
10      *      zero if file appears to be under BLIncLink control
11      *      non-zero otherwise
12      */
13     {
14              Short_string_t history;

15              get_global_history(history,file);
16              if (access(history,R_OK))
17                      return 1;
18              return 0;
19     }

20     char *get_next_arg (char **argv)
21     /*
22      * on entry:
23      *      argv = pointer to rest of argument list
24      * effects:
25      * returns:
26      *      next argument
```

```
1     *       handles arguments via LDOPTS, LD_OPTIONS, and "-c filename"   *       (any such
2     "generated" arguments are allocated permanent           storage)
3     */
4     {
5             char *s, *rc;
6             static char **arg = NULL;
7             static char *env_argp = NULL;
8             static Short_string_t env_args;

9             if (arg == NULL)
10            {
11                    /* haven't gotten to command line yet */
12                    if (env_argp == NULL)
13                    {
14                            /* haven't even looked at environment yet */
15                            *env_args = 0;
16                            s = getenv("LDOPTS");
17                            if (s != NULL &&*s)
18                                    strcat(env_args,s);
19                            s = getenv("LD_OPTIONS");
20                            if (s != NULL && *s)
21                                    strcat(env_args,s);
22                            if (putenv("LDOPTS=") || putenv("LD_OPTIONS="))
23                                    error(E_nomem);
24                            env_argp = env_args;
25                    }
26                    /* inside env_args */
27                    if ((rc = get_next_word(NULL,&env_argp)) != NULL)
28                            return rc;
```

```
1              arg = ++argv;
2          }
3          /* past environment */
4          if (C_file != NULL)
5          {
6              /* in a "-c" file */
7              if ((rc = get_next_word(C_file,&C_line)) != NULL)
8                  return rc;
9              if (fclose(C_file))
10                 error(E_nofile,C_name);
11             C_file = NULL;
12         }
13         /* on command line */
14         return *(arg++);
15     }

16     char *get_next_word (FILE *fp, char **line)/*
17      * on entry:
18      *     fp = file pointer
19      *     line = address of pointer to current position in current line
20      * effects:
21      *     returns next word (whitespace delimited) in *line *
22             if *line is NULL, read *line from fp
23      *     if fp is NULL, return NULL
24      *     *** this routine may munge contents of line ***
25      * returns:
26      *     pointer to word
27      *     if a line is read from a file, storage is allocated for it
28      * on exit:
```

```
1     *      *line = current position in current line
2     */
3     {
4            char *rc;
5            /* make sure we have a line */
6            if (!*line || !**line)
7            {
8                    /* eoln - read next line */
9                    if (fp == NULL)
10                           return NULL;
11                   if ((*line = string_dup(get_next_string(fp,0))) ==NULL)
12                           return NULL;
13           }
14           /* skip initial white space */
15           while (**line && isspace(**line))
16                   ++*line;

17           /* eoln? */
18           if (!**line)
19                   return NULL;
20           /* find end of word */
21           rc = *line;
22           while (**line && !isspace(**line))
23                   ++*line;

24           /* mark end of word and skip past it */
25           if (**line)
26                   *((*line)++) = 0;
```

```
1       /* return */
2       return rc;
3    }
4    char **process_archive (char *archive, int          stat_flag,char**argument_list)

5    /*
6     * on entry:
7     *     archive = name of archive
8     *     stat_flag = true if new modules must be located
9     *     argument list = pointer to end of argument list
10    * effects:
11    *     fills argument_list with names of modified members of archive   *    allocates
12   permanent storage for any generated strings
13    * if in Blinc mode, adds members to argument vector   for $BLINC_PROCESSOR
14    * returns:
15    *     pointer to new end of argument list
16    */
17   {
18       FILE *history_file, *archive_file;
19       struct ar_hdr arhdr;
20       struct stat buf;
21       Short_string_t history_name, stamp_name;
22       char *dirname;
23       char *s, *rw_mode;
24       /* assume archive members are in same directory as archive */
25       dirname = string_dup(archive);
26       if ((s = strrchr(dirname,'/')) == NULL)
27       {
28           free(dirname);
```

```
1               dirname = string_dup("./");
2               stat_flag = 0;
3       }
4       else
5               *++s = 0;
6       if (stat_flag)
7               rw_mode = "w";
8       else
9               rw_mode = "r";
10      get_history(history_name,archive);
11      if ((history_file = fopen(history_name,rw_mode)) == NULL) {
12              free(dirname);
13              *(argument_list++) = archive;
14              return argument_list;
15      }
16      /* find changed modules */
17      if (stat_flag)
18      {
19              if(stat(get_stamp(stamp_name,archive),&buf))
20              {
21                      free(dirname);
22                      *(argument_list++) = archive;
23                      return argument_list;
24              }
25              if ((archive_file = fopen(archive,"r")) ==NULL)
26              {
27                      free(dirname);
28                      *(argument_list++) = archive;
29                      return argument_list;
```

```
1              }
2              fseek(archive_file,SARMAG,SEEK_SET);
3              /* this is symbol table */
4              fread(&arhdr,sizeof arhdr,1,archive_file);
5              /* skip to first real member */
6              fseek(archive_file,atol(ar_trim(arhdr.ar_size,
7                      10)),SEEK_CUR);
8              while (fread(&arhdr,sizeof arhdr,1,archive_file)
9                      == 1 && !feof(archive_file))
10             {
11                     if ((time_t)atol(ar_trim(arhdr.
12                             ar_date,12)) >buf.st_mtime)
13                     {
14                             *(argument_list++) = process_member
15                                     (ar_trim(arhdr.ar_name,16),
16                                     dirname,archive); fprintf
17                                     (history_file,"%s\n",arhdr.ar_name);                    }
18             fseek(archive_file,(atol(ar_trim
19                     (arhdr.ar_size,10))+1)&~1,SEEK_CUR);
20             }
21             if (fclose(archive_file))
22  #pragma BBA_IGNORE
23                     error(E_nofile,archive);

24             }
25             else
26             {
27                     while ((s = get_next_string(history_file,0)) !=NULL)
28                             *(argument_list++)=process_member
```

```
1                                        (s,dirname,archive);
2                           }
3                      if (fclose(history_file))
4      #pragma BBA_IGNORE
5                            error(E_nofile,history_name);
6                      free(dirname);
7                      return argument_list;
8      }
9      char *ar_trim (char *s, int length)
10     /*
11      * on entry:
12      *    s = an array of characters
13      *    length = length of array
14      * effects:
15      *    s is made null-terminated at the first ' ' or '/' character   */
16     {
17             int i;

18             for (i = 0; i < length-1; ++i)
19             {
20                     if (s[i] == ' ' || s[i] == '/' || s[i] == 0)
21                         break;
22             }
23             s[i] = 0;
24             return s;
25     }

26     char *process_member (char *member, char *directory, char            *archive)
27     /*
```

```
1    * on entry:
2    *       member = name of member
3    *       directory = name of directory containing archive
4    *       archive = archive file
5    * returns:
6    *       filename corresponding to member (extracted from archive if    necessary)
7    */
8    {
9            Short_string_t member_name;
10           struct stat buf;
11           char *Arv[Max_args];
12           char **arv = Arv;

13           if (Blinc_mode == Blinc)
14                   *(Blinc_processorvp++) =string_dup(member);
15   strcat(strcpy(member_name,directory),member);
16           if(!stat(member_name,&buf))
17                   return(string_dup(member_name));
18           else
19           {
20                   sprintf(member_name,"%s/%s",Tmpdir,member);
21           *(arv++) = Linker.archiver;
22               *(arv++) = "x";
23               *(arv++) = archive;
24               *(arv++) = member_name;
25               if(forkexec(Linker.archiver,Arv,NULL,NULL))
26                   error(E_nofile,member);
27               else
28                       return(string_dup(member_name));
```

```
1            }
2       }

3       char **process_shlib (char *shlib, char **argument_list)
4       /*
5        * on entry:
6        *      shlib = name of shared library
7        *      argument list = pointer to end of argument list
8        * effects:
9        *      fills argument_list with names of libraries to link in for        this library
10       *      allocates permanent storage for any generated strings
11       * returns:
12       *      pointer to new end of argument list
13       */
14      {
15              Short_string_t  prelink_name;
16              struct stat buf;

17              get_prelink(prelink_name,shlib);
18              if (!stat(prelink_name,&buf))
19                      *(argument_list++) = string_dup(prelink_name);
20              *(argument_list)++ = shlib;
21              return argument_list;
22      }

23      char *string_dup (char *source)
24      /*
25       * on entry:
26       *      source = a string
```

```
1     * returns:
2     *       pointer to a permanent (but free-able) copy of source
3     */
4     {
5             char *d;

6             if (source == NULL)
7                     return NULL;
8             if ((d = (char *)malloc(strlen(source)+1)) == NULL)
9     #pragma BBA_IGNORE
10                    error(E_nomem);
11            return(strcpy(d,source));
12    }

13    int execute_command (void)
14    /*
15     * effects:
16     *       executes appropriate commands based on Blinc_mode and              Output_type
17     */
18    {
19            int rc;
20    #if defined(__hpux) && VERSION == 80
21            if ((pxdb = getenv("LD_PXDB")) == NULL)
22                    pxdb = "/usr/bin/pxdb";
23    #endif
24            switch (Blinc_mode)
25            {
26                    case None:
27    #if defined(__hpux) && VERSION == 80
```

```
 1                    if (Output_type == Shlib)
 2                    {
 3                            sprintf(ld_pxdb,"LD_PXDB=%s","/bin/touch");
 4                            putenv(ld_pxdb);
 5                    }
 6  #endif
 7            r                                                              c
 8  =forkexec(Linker.linker,Argv,NULL,NULL);                    break;
 9            case Prelink:
10                    switch (Output_type)
11                    {
12                    case Relocatable:
13                            error(E_blinc_r);
14                            rc =forkexec(Linker.linker,Argv,
15                                    NULL,NULL);
16                            break;
17                    case Shlib:
18                            rc =do_prelink(Shlib);
19                            break;
20                    case Main:
21  #ifdef IMPLICIT_BLINC
22                            if ((rc = do_prelink(Main)) == 0)
23                            {
24                                    Blinc_mode = Blinc;
25                                    rc =do_blinc(Main);
26                            }
27  #else
28                            rc =do_prelink(Main);
29  #endif
```

```
                                    break;
                    }
                        break;
            case Blinc:
                    switch (Output_type)
                    {
                        case Relocatable:
                            error(E_blinc_r);
                            rc =forkexec(Linker.linker,Argv,
                                    NULL,NULL);
                            break;
                        case Shlib:
                            rc =do_blinc(Shlib);
                            break;
                        case Main:
                            rc =do_blinc(Main);
                            break;
                    }
            }
            return rc;
    } int forkexec (char *program, char **argv, char *out, char *err)
    /*
    * on entry:
    *       progam = program to execute
    *       argv = argument vector
    *       out = file to attach stdout to
    *       err = file to attach stderr to
```

```
1    * effects:
2    *       executes program
3    * returns:
4    *       return code from program
5    */
6    {
7            int stat_loc;

8            if (Verbose_flag)
9            {
10                   int i;

11                   printf("%s",program);
12                   for (i = 1; argv[i] != NULL; ++i)
13                           printf("%s",argv[i]);
14                   printf("\n");
15                   fflush(stdout);
16           }
17           if (fork())
18           {
19                   /* parent */
20                   if (wait(&stat_loc) == (pid_t)-1)
21                           return -1;
22                   else
23                   {
24                           if (WIFEXITED(stat_loc))
25                                   return (WEXITSTATUS(stat_loc));
26                           else
27                                   return -1;
```

```
1                    }
2               }
3          else
4          {
5                    /* child */
6                    if (out != NULL)
7                    {
8                              if (freopen(out,"w",stdout) == NULL)
9                                       error(E_create,out);
10                   }
11                   if (err != NULL)
12                   {
13                             if (freopen(err,"w",stderr) == NULL)
14                                      error(E_create,err);
15                   }
16                   execv(program,argv);
17                   perror("bld");
18                   exit(1);
19             }
20        return -1;
21   }

22   int do_prelink (Output_type_t output_type)
23   /*
24    * on entry:
25    *      output_type = type of output file to create
26    * effects:
27    *      a prelinked module of specified user objects and archives is          built
28    *      some errors are considered fatal...
```

```
 1    * returns:
 2    *    0 on success
 3    *    return code from failed command/function otherwise
 4    */
 5    {
 6         int rc;
 7         char *token, *source;
 8         char **argv, **otherv;
 9         char *setv[Max_args], **setvp;
10         char *temp_name;
11         Short_string_t temp_name_buf, prelink_name, stamp_name;
12         Short_string_t build_shlib, trace_main;
13         regex_t re_main;
14         FILE *temp_file, *stamp_file;
15         char *processor;
16         char *processorv[Max_args];

17         if (output_type == Main)
18         {
19              get_prelink(prelink_name,Output_file);
20              temp_name =temp_name_buf;
21              strcpy(temp_name,Tmpdir);
22              strcat(temp_name,"/trace_main");
23         }
24         else
25         {
26              strcpy(prelink_name,Output_file);
27              strcpy(Linker.trace_main,"");
28              temp_name = NULL;
```

```
1       }
2       /* build argument vector */
3       argv = &Argv[1];
4       *(argv++) = "-o";
5       *(argv++) = prelink_name;
6       strcpy(build_shlib,Linker.build_shlib);
7       source = build_shlib;
8       while ((token = strtok(source," ")) != NULL)
9       {
10              source = NULL;
11              *(argv++) = token;
12      }
13      strcpy(trace_main,Linker.trace_main);
14      source = trace_main;
15      while ((token = strtok(source," ")) != NULL)
16      {
17              source = NULL;
18              *(argv++) = token;
19      }
20      otherv = Prelink_args;
21      while ((*argv = *(otherv++)) != NULL)
22              ++argv;
23 #if defined(__hpux) && VERSION == 80
24      sprintf(ld_pxdb,"LD_PXDB=%s","/bin/touch");
25      putenv(ld_pxdb);
26 #endif
27      /* call system linker */
28      if (rc = forkexec(Linker.linker,Argv,temp_name,NULL))
29      {
```

```
 1              error(E_create,prelink_name);
 2              return rc;
 3       }#if defined(__hpux) && VERSION == 80 &&defined(IMPLICIT_BLINC)
 4              sprintf(ld_pxdb,"LD_PXDB=%s",pxdb);
 5              putenv(ld_pxdb);
 6       #endif
 7              /* execute prelink processor if necessary (often "patch")*/
 8              if ((processor = getenv("PRELINK_PROCESSOR")) != NULL)
 9              {
10                     processorv[0] = processor;
11                     processorv[1] = prelink_name;
12                     processorv[2] = NULL;
13                     if (rc =forkexec(processor,processorv,NULL,NULL))
14                     {
15                            error(E_create,prelink_name);
16                            return rc;
17                     }
18              }
19              /* initialize output file history */
20              setvp = setv;
21              if (output_type == Main)
22              {
23                     /* find "main()" */
24                     if (regcomp(&re_main,Linker.re_main,Reg_flags))
25                            error(E_bad_config,Linker.re_main);
26                     if ((temp_file = fopen(temp_name,"r")) == NULL)
27                            error(E_nofile,temp_name);
28                     while ((source = get_next_string(temp_file,0)) !=              NULL)
29                     {
```

```
1      int found = 0;

2      if (!found &&!regexec(&re_main,source,0,NULL,0))
3      {
4              if ((token = strchr(source,':'))  == NULL)
5                      error(E_bad_config,Linker.re_main);
6              *token = 0;
7              *(setvp++) =string_dup(source);
8              found = 1;
9      }
10     else
11             puts(source);
12     }
13     fflush(stdout);
14     if (fclose(temp_file))
15 #pragmaBBA_IGNORE
16             error(E_nofile,temp_name);
17     regfree(&re_main);
18  }
19  *(setvp++) = NULL;
20  set_history(Output_file,setv);

21  /* initialize archive member histories */
22  otherv = Archives;
23  setv[0] = NULL;
24  while (*otherv !=NULL)
25  {
26          set_history(*otherv,setv);
27          /* also re-create stamp file */
```

```
1              stamp_file =fopen(get_stamp(stamp_name,*otherv),"w");
2              if (fclose(stamp_file))
3     #pragma BBA_IGNORE
4                  error(E_nofile,stamp_name);
5              ++otherv;
6          }

7          /* clean up */
8     #ifdef IMPLICIT_BLINC
9          if (output_type == Main)
10         {
11             /* prepare for Blinc */
12             Objects[0] = NULL;
13             Archives[0] = NULL;
14             User_files[0] = NULL;
15         }
16         else
17    #else
18         if (output_type == Shlib)
19    #endif
20         {
21             get_prelink(prelink_name,Output_file);
22             if (remove(prelink_name) && errno != ENOENT)
23                 error(E_remove,prelink_name);
24         }
25         return 0;
26    }

27    int do_blinc (Output_type_t output_type)
```

```
1   /*
2    * on entry:
3    *    output_type = type of output file to create
4    * effects:
5    *    user files are linked against an existing prelinked module
6    * returns:
7    *    0 on success
8    *    return code from failed command/function otherwise
9    */
10  {
11      Short_string_t prelink_name, blinc_name, history_name;
12      Argument_type_t arg;
13      FILE *history_file;
14      char *setv[Max_args], **setvp;
15      char *histv[Max_args], **histvp;
16      char **argv, **otherv, **post_arg;
17      char *s;
18      struct stat buf;
19      int rc; char *processor;
20      /* get file names */
21      if (output_type == Main)
22      {
23          strcpy(blinc_name,Output_file);
24          get_prelink(prelink_name,Output_file);
25          if(stat(prelink_name,&buf))
26              error(E_nofile,prelink_name);
27      }
28      else
29      {
```

```
 1              get_prelink(blinc_name,Output_file);
 2              *prelink_name = 0;
 3         }
 4         /* get modules from history */
 5         get_history(history_name,Output_file);
 6         setvp = setv;
 7         histvp = histv;
 8         if ((history_file = fopen(history_name,"r")) == NULL)
 9              error(E_nofile,history_name);
10         for (post_arg = Post_args; *post_arg != NULL; ++post_arg)
11              ;
12         while ((s = get_next_string(history_file,0)) != NULL)
13         {
14              /* ignore modules already listed as user files for this
15                   link */
16              otherv = User_files;
17              while ((*otherv != NULL) && strcmp(s,*otherv))
18                   ++otherv;
19              if (*otherv != NULL)
20                   continue;
21              s = string_dup(s);

22              /* retain for set_history() */
23              *(setvp++) = s;

24              /* history modules must be processed for use in this
25                   link */
26              for (arg = (Argument_type_t)0; arg < Num_argument_types;
27              ++arg)
```

```
 1                  if (!regexec(&(Linker.argument[arg]
 2                          .pattern),s,0,NULL,0))
 3                              break;
 4          switch (arg)
 5          {
 6              case User_object:
 7                  *(histvp++) =  s;
 8                  *(Blinc_processorvp++) = s;
 9              break;
10              case User_archive:
11                  *(post_arg++) = s;
12                  histvp = process_archive(s,0,histvp);
13              break;
14              default:
15                  error(E_bad_hist,s);
16          }
17      }
18      *histvp = NULL;
19      *setvp = NULL;
20      if (fclose(history_file))
21 #pragma BBA_IGNORE
22          error(E_nofile,history_name);

23      /* build argument vector */
24      argv = &Argv[1];
25      *(argv++) = "-o";
26      *(argv++) = blinc_name;
27      otherv = Pre_args;
28      while ((*argv = *(otherv++)) != NULL)
```

```
1           ++argv;
2           otherv = histv;
3           while ((*argv = *(otherv++)) != NULL)
4                   ++argv;
5           if (*prelink_name)
6                   *(argv++) = prelink_name;
7           otherv = Post_args;
8           while ((*argv = *(otherv++)) != NULL)
9                   ++argv;
10      #if defined(__hpux) && VERSION == 80
11          if (output_type == Shlib)
12          {
13                  sprintf(ld_pxdb,"LD_PXDB=%s","/bin/touch");
14                  putenv(ld_pxdb);
15          }
16      #endif
17          /* call system linker */
18          if (rc = forkexec(Linker.linker,Argv,NULL,NULL))
19          {
20                  error(E_create,blinc_name);
21                  return rc;
22          }

23          /* execute blinc processor if necessary (often
24              "repatch") */
25          if ((processor = getenv("BLINC_PROCESSOR")) != NULL)
26          {
27                  Blinc_processorv[0] = processor;
28                  Blinc_processorv[1] = *prelink_name ? prelink_name :
```

```
1                  Output_file;
2        if (rc = forkexec(processor,Blinc_processorv,
3                NULL,NULL))
4        {
5                error(E_create,Blinc_processorv[1]);
6                return rc;
7        }
8    }
9    /* for shlib, execute prelink processor as well */
10   if (output_type == Shlib && (processor = getenv
11               ("PRELINK_PROCESSOR")) != NULL)
12   {
13       Blinc_processorv[0] = processor;
14       Blinc_processorv[1] = blinc_name;
15       Blinc_processorv[2] = NULL;
16       if (rc = forkexec(processor,Blinc_processorv,
17               NULL,NULL))
18       {
19               error(E_create,blinc_name);
20               return rc;
21       }
22   }
23   /* update history */
24   otherv = Objects;
25   while ((*setvp = *(otherv++)) != NULL)
26           ++setvp;
27   otherv = Archives;
28   while ((*setvp = *(otherv++)) != NULL)
29           ++setvp;
```

```
1            set_history(Output_file,setv);
2            return 0;
3        }

4    char *get_stamp (char *stamp, const char *file)
5    /*
6     * on entry:
7     *     file = name of file
8     *     stamp = address of buffer to store stamp file name
9     * on exit:
10    *     stamp = name of stamp file
11    * returns:
12    *     stamp
13    */
14   {
15           const char *s;

16           if ((s = strrchr(file,'/')) != NULL)
17                   ++s;
18           else
19                   s = file;
20           strcpy(stamp,s);
21           return(strcat(stamp,".bld_stamp"));
22   }

23   char *get_history (char *history, const char *file)
24   /*
25    * on entry:
26    *     file = name of file
```

| | | |
|---|---|---|
| 1 | * | history = address of buffer to store history file name |
| 2 | * on exit: | |
| 3 | * | history = name of history file |
| 4 | * returns: | |
| 5 | * | history |
| 6 | */ | |
| 7 | { | |
| 8 | | const char *s; |
| 9 | | if ((s = strrchr(file,'/')) != NULL) |
| 10 | | ++s; |
| 11 | | else |
| 12 | | s = file; |
| 13 | | strcpy(history,s); |
| 14 | | return(strcat(history,".bld_history")); |
| 15 | } | |
| 16 | void set_history (char *name, char **list) | |
| 17 | /* | |
| 18 | * on entry: | |
| 19 | * | name = name of file |
| 20 | * | list = list of changed modules |
| 21 | * effects: | |
| 22 | * | associates the list with with name |
| 23 | */ | |
| 24 | { | |
| 25 | | Short_string_t history_name; |
| 26 | | FILE *history_file; |

```
1          get_history(history_name,name);
2          if ((history_file = fopen(history_name,"w")) == NULL)
3                  error(E_create,history_name);
4          while (*(list) != NULL)
5          {
6                  fprintf(history_file,"%s\n",*list);
7                  ++list;
8          }
9          if (fclose(history_file))
10  #pragma BBA_IGNORE
11                 error(E_create,history_name);
12         }

13    void cleanup (int signum)
14    /*
15     * effects:
16     *    removes temporary files
17     */
18    {   Short_string_t rm_cmd;
19        sprintf(rm_cmd,"rm -rf %s",Tmpdir);
20        system(rm_cmd);
21        exit(signum);
22    }

23    void error (int code, ...)
24    /*
25     * main error routine
26     */
27    {
```

```
1     va_list ap;

2     va_start(ap,code);
3     fprintf(stderr,"bld: %s",Error[code].msg);
4     vfprintf(stderr,Error[code].fmt,ap);
5     fprintf(stderr,"\n");
6     va_end(ap);
7     switch (Error[code].severity)
8     {
9         case Fatal:
10            cleanup(1);
11            /*NOTREACHED*/
12            break;
13        case Serious:
14            Rc = 1;
15        case Warning:
16            break;
17    }
18 }
```

What is claimed is:

1. A computer implemented method for incrementally linking modified routines within software, as part of a process for modifying the software, the method comprising:
   (a) prelinking all routines within the software to create a dynamically loadable library file;
   (b) modifying at least one routine;
   (c) linking all modified routines to a separately loadable file; and
   (d) loading all routines within the separately loadable file before loading routines from the dynamically loadable library file, wherein modified routines are loaded from the separately loaded file in place of the equivalent unmodified routines within the dynamically loadable library file.

2. The computer implemented method of claim 1 further comprising the step of:
   (e) repeating steps (b) through (d) for each modification made to the software.

3. The computer implemented method of claim 1 further comprising the step of:
   (f) after all modifications have been made to the software, linking all routines into a single loadable file.

4. The computer implemented method of claim 1 wherein step (c) further comprises the steps of:
   (c1) identifying one of the routines as a main entry routine of the software; and
   (c2) placing the main entry routine into the separately loadable file.

5. The computer implemented method of claim 1 wherein step (a) further comprises the following step (a1) and wherein step (c) further comprises the following steps (c1) and (c2):
   (a1) initializing an empty history file;
   (c1) placing names for all modified routines in the history file; and
   (c2) combining the names from the history file, and the names of the routines in the dynamically loadable library into a single list of names to cause the modified routine to be linked when the same name is found in both files.

6. A computer implemented method for incrementally linking modified routines within software, as part of a process for modifying the software, the method comprising:
   (a) prelinking all routines within the software to create a dynamically loadable library file;
   (b) modifying at least one routine;
   (c) linking all modified routines to a separately loadable file;
   (d) loading all routines within the separately loadable file before loading routines from the dynamically loadable library file, wherein modified routines are loaded from the separately loaded file in place of the equivalent unmodified routines within the dynamically loadable library file; and
   (e) repeating steps (b) through (d) for each modification made to the software.

7. The computer implemented method of claim 6 further comprising the step of:
   (f) after all modifications have been made to the software, linking all routines into a single loadable file.

8. The computer implemented method of claim 6 wherein step (c) further comprises the steps of:
   (c1) identifying one of the routines as a main entry routine of the software; and
   (c2) placing the main entry routine into the separately loadable file.

9. The computer implemented method of claim 6 wherein step (a) further comprises the following step (a1) and wherein step (c) further comprises the following steps (c1) and (c2):
   (a1) initializing an empty history file;
   (c1) placing names for all modified routines in the history file; and
   (c2) combining the names from the history file, and the names of the routines in the dynamically loadable library into a single list of names to cause the modified routine to be linked when the same name is found in both files.

10. A computer program product for incrementally linking modified routines within software, as part of a process for modifying the software, the computer program product comprising:
    a computer usable medium having a computer readable program means for causing the computer to
    (a) prelink all routines within the software to create a dynamically loadable library file;
    (b) modifying at least one routine;
    (c) linking all modified routines to a separately loadable file; and
    (d) loading all routines within the separately loadable file before loading routines from the dynamically loadable library file, wherein modified routines are loaded from the separately loaded file in place of the equivalent unmodified routines within the dynamically loadable library file.

11. The computer program product of claim 10 wherein the computer readable program means further causes the computer to:
    (e) repeat steps (b) through (d) for each modification made to the software.

12. The computer program product of claim 10 wherein the computer readable program means further causes the computer to:
    (e) after all modifications have been made to the software, link all routines into a single loadable file.

13. The computer program product of claim 10 wherein the computer readable program means step (c) further causes the computer to perform the following steps:
    (c1) identify one of the routines as a main entry routine of the software; and
    (c2) place the main entry routine into the separately loadable file.

14. The computer program product of claim 10 wherein the computer readable program means step (a) further causes the computer to perform the following step (a1), and further wherein the computer readable program means step (c) further causes the computer to perform the following steps (c1) and (c2):
    (a1) initialize an empty history file;
    (c1) place names for all modified routines in the history file; and
    (c2) combine the names from the history file, and the names of the routines in the dynamically loadable library into a single list of names to cause the modified routine to be linked when the same name is found in both files.

* * * * *